Aug. 31, 1965

N. N. MOORE ETAL 3,203,261

GYRO ERECTION CONTROL SYSTEM

Filed Feb. 15, 1962

INVENTORS
NATHANIEL N. MOORE
MARIO PEREZ JR.
SEYMOUR ACKERMAN
BY *Herbert L. Davis*
ATTORNEY INVENTORS
NATHANIEL N. MOORE
MARIO PEREZ JR.
SEYMOUR ACKERMAN
BY *Herbert L. Harris*
ATTORNEY

United States Patent Office 3,203,261
Patented Aug. 31, 1965

3,203,261
GYRO ERECTION CONTROL SYSTEM
Nathaniel N. Moore, Wayne, N.J., Mario Perez, Jr., Pearl River, N.Y., and Seymour Ackerman, White Meadow Lake, Rockaway, N.J., assignors to The Bendix Corporation, Teterboro, N.J., a corporation of Delaware
Filed Feb. 15, 1962, Ser. No. 173,476
7 Claims. (Cl. 74—5.47)

The invention relates to improvements in an erection control system for a gyroscope of a type to minimize those errors in gyroscopes due to turning maneuvers of an aircraft as explained generally in U.S. Patent No. 2,848,898 granted August 26, 1958, to Sheldon M. Waldow and assigned to The Bendix Corporation. More particularly, the inventions relates to a novel simplified erection, system cutout switch arrangement to minimize such turn errors in gyroscopes by effectively disconnecting the erection system during aircraft turn maneuvers and in response directly to deviation of the spin axis of the rotor of the gyroscope from a predetermined attitude tending to approach a gimbal lock position as during excessive turn maneuvers of the aircraft.

As explained in the aforenoted Patent No. 2,848,898, gyroscopes, such as used in aircraft, are subject to errors as a result of turning maneuvers of the aircraft. During such maneuvers, it has been found that operation of an erection torquer, designed normally to aid in holding the spin axis of the gyroscope in its proper attitude, may under certain turning maneuvers tend to increase the error rather than erect the gyroscope unless the erection torquer be cut out of operation.

However, such cutting out of automatic operation of the erection torquer during such turning maneuvers, while appearing as a possible solution to the initial problem, may under extended turning maneuvers of the aircraft give rise to a second problem in tending to cause tumbling of the gyroscope, further error, as well as possible damage to the gyroscope if the cutout in the automatic operation of the erection system be unduly prolonged.

An object of the invention is to provide an erection system for a vertical gyroscope as well as a directional gyroscope utilizing a novel level cut out switch arrangement to disconnect the erection system during aircraft turn maneuvers in response to the attitude of the spin axis of the rotor of the gyroscope and novel means cooperatively controlled by the cutout switch to re-activate the erection system as a function of time after the initial gyro erection cutout so as to prevent an indefinite loss of gyro erection as a result of extended or peculiar maneuvers of the aircraft upon which the gyroscope is mounted.

The invention arose in an effort to simplfy the prior erection system and increase its reliabilty and reduce the costs associated with the prior gyroscope erection system. Heretofore, a rate switching gyroscope unit was used to cut out the erection system of the gyroscope, as explained in the aforenoted prior U.S. Patent No. 2,848,-898. In the prior system, however, there was no means provided whereby the erection system would be cut out of operation in response directly to the angular position of the rotor axis of the erection controlled gyroscope inasmuch as the additional rate switching gyroscope unit was not operatively connected to the rotor case of the gyroscope controlled by the erection system. In distinction, in the present invention the erection system is disconnected as a function of a cutout switch mechanism operatively positioned about the axis of the rotor case of the gyroscope and directly responsive to deviation in the attitude of the spin axis of the rotor of the gyroscope as the angular position thereof may approach a gimbal lock position.

Moreover, in order to correct for conditions in which such cutout switch mechanism in response to an extended deviation in the attitude of the spin axis of the rotor of the gyroscope might disconnect the erection system for an undesirable period of time, there is provided a time delay relay to re-institute the erection circuit of the gyroscope at a predetermined time after the erection system has been removed or cut out of operation, the cutout switch mechanism being thereafter ineffective until the attitude of the spin axis has been erected and there has once again been an extended deviation in the attitude thereof.

An object of the invention, therefore, is to provide a simplified arrangement to cut out of operation the erection torquer during turn maneuvers for a short period of time so as to avoid gyro tumbling and other disadvantages.

Another object of the invention is to provide in such a simplified arrangement a cutout switching mechanism so arranged as to avoid a cut out of the erection system during slight turns of a magnitude not sufficient to normally effect stability of the gyroscope, while serving to effectively cut out of operation the erection system in response to a relatively large deviation in the attitude of the spin axis of the rotor of the gyroscope indicative of an aircraft turn of a sufficient magnitude as to effect the stability of the gyroscope, while providing means cooperating therewith to effectively cut into operation the gyro erection system after a predetermined time delay period.

The invention further lies in the particular structure disclosed, as well as in the general organization of its various elements and in their cooperative association with one another to effect the result intended herein.

These and other objects and features of the invention are pointed out in the following descrption in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
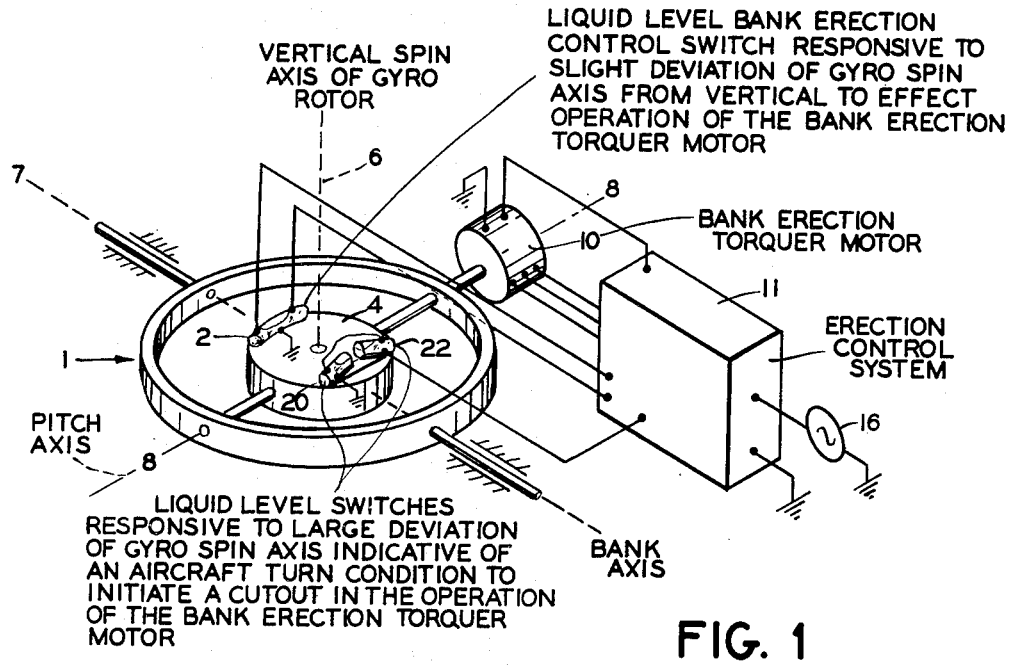
FIGURE 1 is a diagrammatic illustration of a gyroscope embodying the invention as applied to an erection system for a vertical gyroscope.

Referring to the drawing of FIGURE 1, there is shown schematically a conventional vertical gyroscope 1, such as might be used in aircraft and which carries on the rotor case of the gyroscope a liquid level control switch 2 of conventional type such as shown, for example, in U.S. Patent No. 2,890,430 granted June 9, 1959 to Fred Jean Cid and assigned to The Bendix Corporation. The switch 2 is mounted on the case 4 of the rotor of the gyroscope and is arranged to detect variations in the attitude of a vertical spin axis 6 of the rotor of the gyroscope upon a turning movement of the rotor case 4 about the sensitive bank axis 7 of the gyroscope in response to slight variation in the spin axis 6 from the vertical so as to effect operation of a conventionally mounted back erection torquer motor 10.

The torquer motor 10 under the control of the switch 2 may apply a torque to the pitch axis 8 and in a sense controlled by the switch 2 in conventional manner so as to precess the gyroscope so as to return the spin axis 6 of the rotor of the gyroscope 1 to the vertical spin axis position. As shown diagrammatically in FIGURE 1, the torquer motor 10 is normally controlled by the liquid level control switch 2 through an erection control system 11, including a control line 12 and phase shifting capacitor 14 leading from a suitable source of alternating current 16, as shown schematically in FIGURE 3.

Again referring to the drawing of FIGURE 1, there are further mounted on the casing 4 of the rotor of the gyroscope 1 a pair of serially connected liquid level switches 20 and 22 of conventional type or the same may be an electrolytic tilt device of a type such as disclosed and claimed in U.S. Patent No. 2,977,559 granted March 28, 1961 to Andrew M. Rosenberg, Joseph R. Conway and Howard E. Schulien and assigned to The Bendix Corporation.

Figure 3:
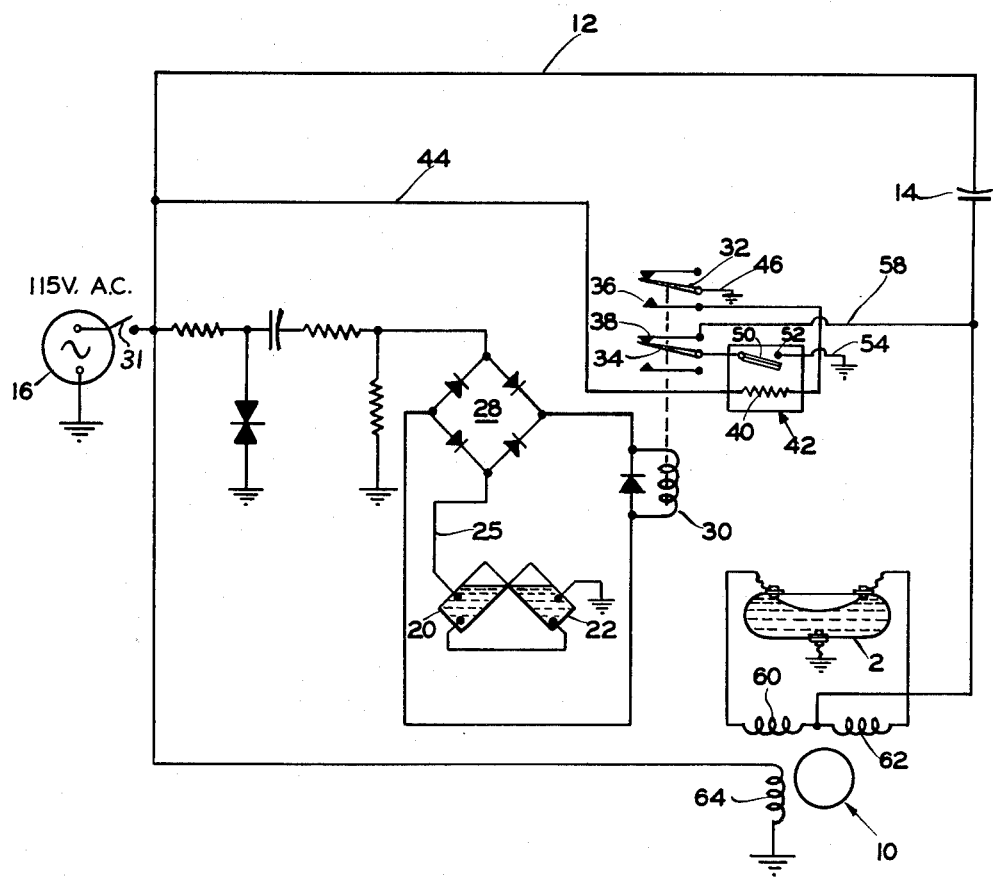
FIGURE 3 is a schematic wiring diagram illustrating the novel erection control system for the torquer motor of the gyroscope of FIGURES 1 and 2.

As shown in FIGURE 3, the switches 20 and 22 may be arranged so as to open a circuit 25 controlling energization of an electromagnetic winding 30 in response to an angular adjustment of the vertical gyro spin axis 6 from the vertical position in excess of a predetermined range about the bank axis 7 indicative of an aircraft turn condition sufficient to initate the cutout in the operation of the bank erection torquer motor 10 and at a somewhat wider angular position of the spin axis 6 than that at which the level switch 2 is effective to provide the controlling action of the torquer motor 10 upon a relatively slight deviation in the spin axis 6.

Thus, the liquid level cutout switches 20 and 22 sense a predetermined relationship of the dynamic vertical of the aircraft relative to the position of the roll gimbal or rotor casing 4 of the gyroscope 1 upon which they are mounted.

Referring now to the wiring diagram shown in FIGURE 3, it may be seen that the illustrated control circuit is shown in a deenergized condition with a control switch 31 in an open condition. However upon the application of electrical energy from the source of alternating current 16 to the control circuit of FIGURE 3 by the closure of switch 31, the liquid level control switches 20 and 22 will effectively conduct current applied through rectifier 28 to a relay coil 30 which in response thereto is effectively energized so as to bias the relay control switches 32 and 34 to a downward position in which the switch arm 32 closes a switch contact 36 and the relay switch 34 opens a switch contact 38.

The closure of the switch contact 36 by the switch arm 32 causes effective energization of a heater element 40 of a time delay relay 42 by electrical energy applied from the source 16 through conductor 44, heater 40, closed contact 36 and relay switch arm 32 to a ground connection 46 and thereby back to the source of electrical energy 16. Energization of the heater 40 causes a bi-metallic switch element 50 of the time delay relay 42 to close a switch contact 52 after a predetermined time interval.

Now upon either the liquid level switch 20 or 22 being opened in response to a deviation in the normally vertical spin axis 6 from a vertical position and in excess of the aforenoted predetermined range indicative of an excessive aircraft turn condition, the operation of the erection torquer motor 10 is thereupon rendered ineffective. In the latter cutout operation, the thermal switch arm 50 in closing the switch contact 52 effectively connects a ground connection 54 through the thermal switch arm 50 to relay switch arm 34 and thereby to contact 38 and through conductor 58 to effectively short out of operation the liquid level bank erection switch 2 and the circuit for selectively energizing the windings 60 and 62 of the torquer motor 10 for controlling the sense of the torque applied thereby about the pitch axis 8. The torquer motor 10 may be of a conventional two-phase type having a fixed phase winding 64 connected across the source of alternating current 16 and the direction controlling windings 60 and 62.

Further upon de-energization of the relay winding 30, the relay switch arm 32 is biased upwardly under spring tension so as to effectively open the switch contact 36 to de-energize the heater 40 of the time delay relay 42 and initiate a cooling cycle for the time delay relay 42.

It will be seen then that if the liquid level switches 20 and 22 are not readjusted to within the aforenoted predetermined operating range for closing the energizing circuit for the relay winding 30 before the time delay relay 42 has cooled, the bi-metallic thermal switch element 50 of the time delay relay 42 will upon completion of the cooling cycle open the contact 52 so as to disconnect the ground connection 54 which will in turn re-institute the normal erection operation of the torquer motor 10 under the control of the level switch 2 regardless of the adjusted position of the cutout switches 20 and 22. Thereafter, the liquid level switches 20 and 22 are ineffective to cut out the operation of the erection system until the relay winding 30 has been re-energized for a sufficient time to allow the heater 40 to effect closure of the contact 52 by the bi-metallic switch element 50 which thereupon condition the cutout mechanism for effective operation.

Through this novel arrangement, the erection system is allowed to remain inactive only for the period of time which the time delay relay 42 requires to cool. This assures that the erection system will be reinstituted even if the gyro gimbal position in the course of the aircraft maneuvers may be such as to cause either the cutout switch 20 or 22 to remain open.

Operation

From the foregoing, it may be seen that in the case of a slight roll or banking maneuver of the aircraft sensed by the vertical gyro 1 and which might cause in response thereto the normal operation of the bank erection control switch 2, but which would not affect the stability of the vertical gyroscope, it would be desirable that the erection motor 10 under such conditions not be cut out of operation. In the present invnetion this desirable operation is effected by the arrangement of the liquid level cutout switches 20 and 22 so as to open the energizing circuit for the relay winding 30 only in response to sufficiently large deviations of the spin axis 6 of the rotor of the gyroscope 1 as would be indicative of somewhat greater aircraft roll or banking conditions while under relatively slight roll or banking conditions of the aircraft cut out of the operation of the bank erection torquer motor 10 is not effected.

However, upon the roll or banking conditions being sufficiently severe, one or the other of the liquid level cutout control switches 20 and 22, depending upon the sensed condition, will be effectively operated so as to open the circuit to the relay winding 30 and cut out the operation of the torquer motor 10 by de-energizing the relay winding 30 and causing the switch arm 34 to close the contact 38 and thereby cut out of operation the normal erection control system by shunting the control circuit for the torquer motor 10 through conductor 58, contact 34 and switch 38, switch 50 and contact 52 and grounded connection 54.

However, as heretofore explained in the aforenoted U.S. Patent No. 2,848,898, a prolonged disconnection of the erection system is to be avoided, less tumbling, further error, and possible damage to the gyroscope occur. In the present invention in order to avoid such a prolonged disconnection of the erection system, there is provided a thermal time delay relay 42 cooperatively arranged in relation to the liquid level cutout control switches 20 and 22 so as to cut the erection system back into operation after the desired delay period by the opening of the shunting circuit through the operation of the time delay relay 42.

In such operations, the heater element 40 of the thermal time delay relay 42 is so arranged as to provide the desired delay period in the opening of the switch contact 52 by the switch arm 50 and to thereby automatically cut the erection motor 10 into operation again. Accordingly, the erection system is cut out for the predetermined delay period provided by delay relay 42. This period of disconnection is desirable as it will eliminate errors due to prolonged banking maneuvers of an aircraft.

It can now be appreciated that the erection system of the present invention provides a simple erection control and cutout switching means 20 and 22 with cooperating time delay relay 42 to effectively eliminate significant banking errors for practically all banking maneuvers and so arranged as to prevent tumbling, and possible consequent damage to the gyroscope. The delay period provided by the thermal time delay relay 42 is predetermined on the basis of the tumbling characteristics of the gyroscope 1, and is of such a limited duration as not to permit the gyroscope 1 to tumble. Thus the erection motor 10 for the gyroscope is rendered operative by the opening of the shunting circuit for the erection motor 10 by switch 50 of the thermal time delay relay 42.

It will be seen from the drawings of FIGURES 1 and 3 that the liquid level cutout switches 20 and 22 sense a predetermined relationship of the dynamic vertical of the aircraft to the position of the roll gimbal of the gyroscope 1 or rotor case 4 upon which the cutout switches 20 and 22 are mounted whereupon one or the other of the normally closed cutout switches 20 and 22 is opened to de-energize the relay winding 30.

When relay winding 30 is energized, relay switch 32 closes contact 36 so that electrical power may be supplied to the heater 40 of the time delay relay 42 to cause the bi-metallic switch arm 50 to close contact 52. Such operation of the relay winding 30 also causes the relay switch 34 to open contact 38 removing the ground connection 54 from the erection control circuit, whereupon the erection circuit may function in the normal manner.

However, upon aircraft maneuvers being such as to cause one of the liquid level control switches 20 or 22 to open the circuit to the relay winding 30 in response to the aforenoted relationship of the dynamic vertical of the aircraft to the roll gimbal of the gyroscope 1, this in turn causes an effective de-energization of the relay winding 30.

Upon such de-energization of the winding 30, the relay switch arm 34 is biased upwardly under spring tension so as to close relay contact 38 and in turn connect the ground connection 54 to the erection torquer circuit through the time delay relay 42 and the conductor 58. At the same time, upon such de-energization of the relay winding 30, the relay switch arm 32 is biased upwardly under spring tension so as to open relay switch contact 36 and thereby the circuit to the heater 40 whereupon the heater 40 of the time delay relay 42 starts its cooling cycle.

If the opened liquid level cutout control switch 20 or 22 is not returned to the closed position so as to cause the re-energization of the relay winding 30 before the time delay relay 42 has completed the cooling cycle, the time delay relay 42 will in time remove the ground connection 54 from the conductor 58 by the bi-metallic thermal switch arm 50 opening the switch contact 52 in the course of the cooling cycle.

The opening of the switch contact 52 by switch arm 50 will in turn re-establish the normal erection operation regardless of the position of the cutout switches 20 and 22. Thus the erection system is permitted to remain inactive only for the period of time that the time delay relay 42 requires to cool. This assures that the erection system will be re-established even if the aircraft maneuvers be such as to cause one or the other of the cutout level switchs 20 or 22 to remain open. Thus, there is provided in the present device a novel simplified arrangement or safety feature to prevent indefinite loss of operation of the erection system in which the liquid level cutout switches 20 and 22 are so provided for effecting the desired erection cutout operation.

As shown diagrammatically in FIGURE 2, an erection control system 11A of the type shown schematically in FIGURE 3, may be applied to a directional gyroscope such as indicated by the numeral 1A to control the erection thereof in a manner similar to that heretofore described with reference to FIGURE 1. In the diagrammatic diagram drawing of FIGURE 2 corresponding parts to those in FIGURE 1 have been indicated by like numerals to which there have been applied the letter A.

Figure 2:
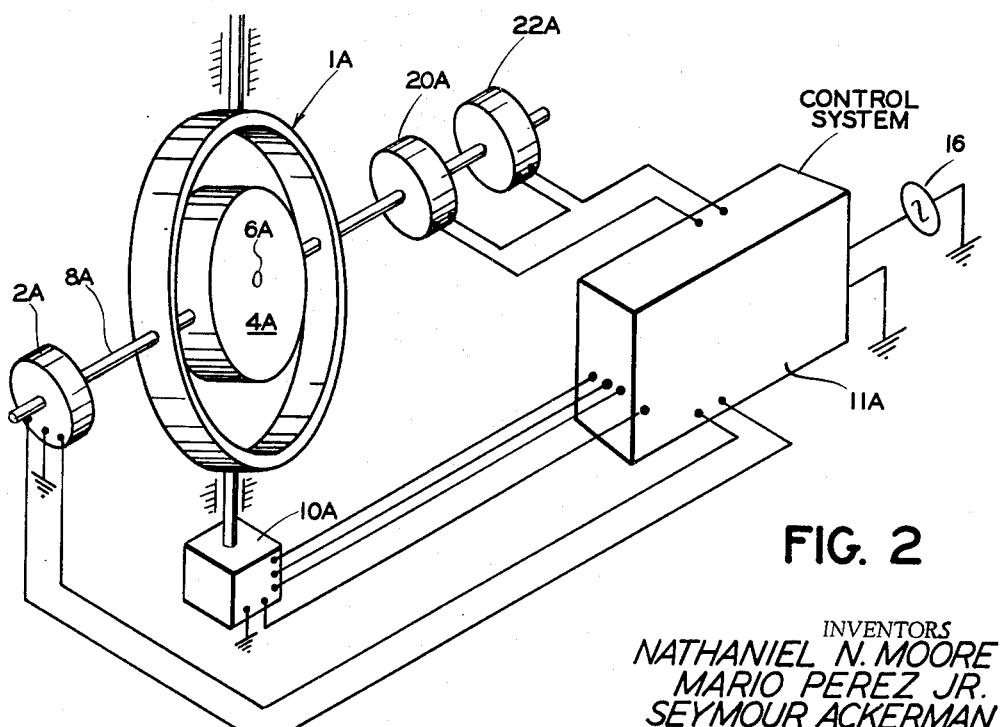
FIGURE 2 is a diagrammatic illustration of a gyroscope embodying the invention as applied to an erection system for a directional gyroscope.

Thus, as shown diagrammatically in FIGURE 2, the torquer motor 10A is normally controlled by a liquid level control switch 2A through the erection control system 11A, which as shown in FIGURE 3 includes a control line 12 and phase shifting capacitor 14 from a suitable source of alternating current 16 through the control switch 2 to one or the other of the direction controlling windings 60 or 62 of the two-phase torquer motor 10A to apply a torque about a vertical axis of the directional gyroscope to precess the directional gyroscope 1A back to proper position about the pitch or horizontal axis 8A thereof.

Again referring to the drawing of FIGURE 2, there are further mounted on the horizontal axis 8A of the rotor casing 4A of the directional gyroscope 1A a pair of serially connected liquid level switches 20A and 22A of conventional type or the same may be electrolytic tilt devices of the type such as disclosed and claimed in the aforenoted U.S. Patent No. 2,977,559.

As shown in FIGURE 3, the switches 20A and 22A may be arranged so as to open a circuit controlling energization of an electromagnetic winding 30 in response to an angular adjustment of the spin axis 6A from a horizontal position in excess of a predetermined range about the horizontal axis 8A indicative of an aircraft turn condition sufficient to initiate the cutout in the operation of the erection torquer motor 10A and at a somewhat wider angular position of the spin axis 6A than that at which the level switch 2A is effective to provide the controlling action of the erection torquer motor 10A upon a relatively slight deviation of the spin axis 6A.

Thus, the liquid level cutout switches 20 and 22 sense a predetermined relationship of the dynamic vertical of the aircraft relative to the position of the rotor casing 4A of the directional gyroscope 1A or horizontal axis 8A thereof on which the switches 20A and 22A are mounted. Referring now to the wiring diagram of FIGURE 3, no further explanation of the operation of the erection control system 11A as applied to the directional gyroscope 1A of FIGURE 2 is deemed necessary inasmuch as it follows the operation of the system as heretofore explained with reference to the vertical gyroscope 1 of FIGURE 1.

Although two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed:
1. In an erection system for a gyroscope of an aircraft having a dynamic vertical varying with flight conditions of the aircraft, said gyroscope including a rotor case with a pivotal horizontal axis, rotor means rotatably mounted in said case and having a spin axis tending to deviate from a predetermined relationship to the dynamic vertical of the aircraft during a turning maneuver of said aircraft, said erection system being of a type including a level switch for controlling the operation thereof, a first relay means to cut the level switch of the erection system out of operation, and a second time delay relay means controlled by said first relay means and effective to render the level switch of the erection system operative after a predetermined delay upon the turning maneuver of the aircraft having been continuous for a period exceeding said predetermined delay; the improvement comprising a switch mechanism operatively connected to directly control said first relay means, and means operatively connecting the rotor case of said gyroscope to said switch mechanism so as to effectively operate said first relay means in a sense to cut the erection system out of operation in response to an excessive deviation in the spin axis of the rotor means from said predetermined relationship to the dynamic vertical of said aircraft during said turning maneuver of the aircraft.

2. In a gyroscope comprising means for erecting the gyroscope to a predetermined position upon the latter varying therefrom, relay means actuatable in first and second senses, switch means operable by the relay means upon the latter being actuated in said first sense to cut the erection system out of operation, time delay means operable upon the latter being actuated in said first sense to cut the erection system into operation after a delay period, said switch means being operable by the relay means upon the latter being actuated in said second sense to cut the erection system into operation, means for controlling said relay means, and means operably connecting said gyroscope directly to said control means so as to render said control means effective upon a variance in the position of the gyroscope from the aforesaid predetermined position and in excess of a minimum range so as to cause said relay means to be actuated in said first sense while rendering said control means effective to cause said relay means to be actuated in said second sense upon the gyroscope being erected to within the aforesaid minimum range.

3. In a vertical gyroscope for an aircraft, said gyroscope comprising a rotor case with a pivotal pitch axis, a rotor means rotatably mounted in said rotor case and having a spin axis tending to deviate from a predetermined vertical position during a turning maneuver of said aircraft, means for erecting the spin axis of the rotor means to said predetermined vertical position upon the latter deviating therefrom, relay means for controlling said erecting means, said relay means being operable in first and second senses, first switch means operable by the relay means upon the latter being actuated in said first sense to cut the erection system out of operation, time delay means rendered effective by said first switch means upon actuation of said relay means in said first sense to cut the erection system into operation after a delay period, said first switch means being operable by the relay means upon the latter being actuated in said second sense to cut the erection system into operation, means for pivotally supporting said rotor case on a pitch axis perpendicular to the spin axis of the rotor means, said pivotal supporting means being carried by a gimbal pivotally mounted on a bank axis extending perpendicular to the pitch axis, said erecting means including a reversible motor means to apply a torque about the pitch axis of the rotor case, and a level switch operatively connected to the rotor case and controlling the motor means so as to cause the torque to be applied thereby in a sense to correct for said deviation in the spin axis, second switch means for directly controlling said relay means in response to the pivotal movement of said gimbal on said bank axis so as to effect operation of said relay means in said first sense upon a variance in the position of the spin axis of the rotor means from said predetermined vertical position and in excess of a predetermined range, and said second switch means effecting operation of said relay means in said second sense upon the spin axis of the rotor means being erected to within said predetermined range.

4. In a directional gyroscope for an aircraft, said gyroscope comprising a rotor case, a rotor means rotatably mounted in said case and having a spin axis tending to deviate from a predetermined horizontal position during a turning maneuver of said aircraft, means for erecting the spin axis of the rotor means to said predetermined horizontal position upon the latter deviating therefrom, relay means for controlling said erecting means, said relay means being operable in first and second senses, first switch means operable by the relay means upon the latter being actuated in said first sense to cut the erection system out of operation, time delay means rendered effective by said first switch means upon actuation of said relay means in said first sense to cut the erection system into operation after a delay period, said first switch means being operable by the relay means upon the latter being actuated in said second sense to cut the erection system into operation, means for pivotally supporting said rotor case on a horizontal axis perpendicular to the spin axis of the rotor means, said pivotal supporting means being carried by a gimbal pivotally mounted on a vertical axis extending perpendicular to the horizontal axis, said erecting means including a reversible motor means to apply a torque about the vertical axis of the gimbal and a level switch operatively connected to the rotor case and controlling the motor means so as to cause the torque to be applied thereby in a sense to correct for said deviation in the spin axis, second switch means for directly controlling said relay means in response to the pivotal movement of said supporting means on said horizontal axis so as to effect operation of said relay means in said first sense upon a variance in the position of the spin axis of the rotor from said predetermined horizontal position and in excess of a predetermined range, and said second switch means effecting operation of said relay means in said second sense upon the spin axis of the rotor means being erected to within said predetermined range.

5. In an erection system for a gyroscope of an aircraft having a dynamic vertical varying with flight conditions of the aircraft, said gyroscope including a rotor case pivotal about a horizontal axis and supporting a rotor means therein having a spin axis tending to deviate from a predetermined relationship to the dynamic vertical of the aircraft during a turning maneuver of said aircraft, a reversible torquer motor for erecting the spin axis to the predetermined relationship to the dynamic vertical of the aircraft, a liquid level control switch operatively connected to said rotor case and arranged to control said torquer motor so as to cause said torquer motor to apply a torquer in one sense upon a deviation of the spin axis from the predetermined relationship to the dynamic vertical in one sense and to cause said torquer motor to apply a torque in one sense upon a deviation of the spin axis from the predetermined relationship to the dynamic vertical in another sense so as to correct for said divations in said one and other senses; the improvement comprising a pair of liquid level switches operatively connected to said rotor case and connected electrically in series, one of said pair of switches being operable to open said series connection in response to an excessive deviation of the spin axis from the predetermined relationship to the dynamic vertical in a first sense and the other of said pair of switches being operable to open said series connection in response to an excessive deviation of the spin axis from the predetermined relationship to the dynamic vertical in a second sense, a relay means directly controlled by said pair of switches upon said operation thereof in said first or second senses to render said liquid level control switch inoperative upon an excessive deviation of the spin axis from the predetermined relationship to the dynamic vertical in either of the two senses, and a time delay switch rendered effective by said relay means upon operation of said pair of switches in said first or second senses to render said liquid level control switch operative to effect said control of the torquer motor after a predetermined delay period.

6. In a vertical gyroscope for an aircraft, said gyroscope comprising a rotor case pivotal about a pitch axis and supporting a rotor means therein having a spin axis tending to deviate from a predetermined vertical position during a turning maneuver of said aircraft, a reversible torquer motor for erecting the spin axis to the predetermined vertical position upon the latter deviating therefrom, a single liquid level control switch operatively connected to said rotor case to cause said torquer motor to apply a torque in one sense upon a deviation of the spin axis from the vertical in one sense and to cause said torquer motor to apply a torque in another sense upon a deviation of the spin axis from the vertical in another sense, a pair of liquid level switches operatively connected to said rotor case and connected electrically in series, one of said pair of switches being operable in a first sense in response to an excessive deviation of the spin axis from the vertical in said one sense and the other of said pair of switches being operable in a second sense in response to an excessive deviation of the spin axis from the vertical in said other sense, a relay directly controlled by said pair of switches upon operation thereof in said first or second senses to render said single liquid level control switch of the erection system inoperative upon an excessive deviation of the spin axis from the vertical in either said one or other senses, a gimbal supporting the pitch axis of the rotor case and pivotally mounted on a bank axis extending perpendicular to the pitch axis, said pair of switches being operable in said first and second senses to directly effect said control of said relay means in response to an excessive pivotal movement of said gimbal on said bank axis, and a time delay switch rendered effective by said relay means upon the operation of said pair of switches in said first or second senses to render the single liquid level control switch of the erection system operative after a delay period.

7. In a directional gyroscope for an aircraft, said gyroscope comprising a rotor case pivotal about a pitch axis and supporting a rotor means therein having a spin axis tending to deviate from a predetermined horizontal position during a turning maneuver of said aircraft, a reversible torquer motor for erecting the spin axis to the predetermined horizontal position upon the latter deviating therefrom, a single liquid level control switch operatively connected to said rotor case to cause said torquer motor to apply a torque in one sense upon a deviation of the spin axis from the horizontal in one sense and to cause said torquer motor to apply a torque in another sense upon a deviation of the spin axis from the horizontal in another sense, a pair of liquid level switches operatively connected to said rotor case and connected electrically in series, one of said pair of switches being operable in a first sense in response to an excessive deviation of the spin axis from the horizontal in said one sense and the other of said pair of switches being operable in a second sense in response to an excessive deviation of the spin axis from the horizontal in said other sense, a relay means directly controlled by said pair of switches upon operation thereof in said first or second senses to render said single liquid level control switch of the erection system inoperative upon an excessive deviation of the spin axis from the horizontal in either said one or other senses, a gimbal supporting the pitch axis of the rotor case and pivotally mounted on a vertical axis extending perpendicular to the pitch axis, said pair of switches being operable in said first and second senses to directly effect said control of said relay means in response to an excessive pivotal movement of said rotor case on said pitch axis, and a time delay switch rendered effective by said relay means upon the operation of said pair of switches in said first or second senses to render the single liquid level control switch of the erection system operative after a delay period.

References Cited by the Examiner

UNITED STATES PATENTS

| | | | |
|---|---|---|---|
| 2,561,367 | 7/51 | Haskins | 74—5.2 X |
| 2,848,898 | 8/58 | Waldow | 74—5.34 |
| 2,995,040 | 8/61 | Hammon | 74—5.47 |

BROUGHTON G. DURHAM, *Primary Examiner*.

UNITED STATES PATENT OFFICE
CERTIFICATE OF CORRECTION

Patent No. 3,203,261                      August 31, 1965

Nathaniel N. Moore et al.

It is hereby certified that error appears in the above numbered patent requiring correction and that the said Letters Patent should read as corrected below.

Column 8, line 44, for "torquer" read -- torque --; line 47, for "one" read -- another --; line 49, for "divations" read -- deviations --.

Signed and sealed this 5th day of April 1966.

(SEAL)
Attest:

ERNEST W. SWIDER
Attesting Officer

EDWARD J. BRENNER
Commissioner of Patents